US009251300B2

(12) United States Patent
Hutton et al.

(10) Patent No.: US 9,251,300 B2
(45) Date of Patent: Feb. 2, 2016

(54) METHODS AND TOOLS FOR DESIGNING INTEGRATED CIRCUITS WITH AUTO-PIPELINING CAPABILITIES

(71) Applicant: Altera Corporation, San Jose, CA (US)

(72) Inventors: Michael D. Hutton, Mountain View, CA (US); Chuck Rumbolt, Newfoundland and Labrador (CA); Jeffrey Fox, Los Gatos, CA (US); Herman Henry Schmidt, Palto Alto, CA (US)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 14/064,031

(22) Filed: Oct. 25, 2013

(65) Prior Publication Data

US 2015/0121319 A1    Apr. 30, 2015

(51) Int. Cl.
 G06F 17/50    (2006.01)
(52) U.S. Cl.
 CPC .............. *G06F 17/50* (2013.01); *G06F 17/505* (2013.01); *G06F 2217/84* (2013.01)
(58) Field of Classification Search
 CPC ................................ G06F 17/30; G06F 17/50
 USPC ......................................................... 716/101
 See application file for complete search history.

(56) References Cited

U.S. PATENT DOCUMENTS

| 7,360,190 | B1 | 4/2008 | Singh et al. | |
| 7,676,768 | B1 * | 3/2010 | Bourgeault et al. | 716/126 |
| 8,893,071 | B1 * | 11/2014 | Gaide | 716/134 |
| 2004/0225970 | A1 * | 11/2004 | Oktem | 716/1 |
| 2009/0293032 | A1 * | 11/2009 | Oktem | 716/6 |
| 2009/0313314 | A1 * | 12/2009 | Mundarath et al. | 708/405 |
| 2010/0097107 | A1 * | 4/2010 | Dartu et al. | 327/141 |
| 2013/0268903 | A1 | 10/2013 | Michel et al. | |
| 2013/0290680 | A1 * | 10/2013 | Keller et al. | 712/208 |
| 2014/0143744 | A1 * | 5/2014 | Dimond | 716/105 |

OTHER PUBLICATIONS

Weaver et al., "Post-Placement C-slow Retiming for the Xilinx Virtex FPGA" International Symposium on FPGAs 2003, Feb. 2003, 10 pages. Retrieved from the Internet:URL:http://citeseerx.ist.psu.edu/viewdoc/download?doi=10.1.1.86.2001&rep=rep1&type=pdf{Retrieved on Oct. 25, 2013].

* cited by examiner

*Primary Examiner* — Mohammed Alam
(74) *Attorney, Agent, or Firm* — Jason Tsai

(57) ABSTRACT

A circuit designer may use computer-aided design (CAD) tools to implement an integrated circuit design. The CAD tools may include auto-pipelining capabilities to improve the performance of the integrated circuit design. Auto-pipelining may modify the number of pipeline registers in a path within a given range. A description of the integrated circuit design may include different implementation alternatives of a path each having a different number of pipeline registers, and the CAD tools may select one of these implementation alternatives. The CAD tools may further evaluate the performance of a particular implementation alternative and iteratively select a different implementation alternative until a given objective is met. The CAD tool may update a test environment according to the selected implementation alternative once the objective is met and validate the selected implementation alternative using the updated test environment.

28 Claims, 9 Drawing Sheets

METHODS AND TOOLS FOR DESIGNING INTEGRATED CIRCUITS WITH AUTO-PIPELINING CAPABILITIES

BACKGROUND

This invention relates to integrated circuit design and, more particularly, to verifiable automatic register pipelining of integrated circuit design descriptions at the register transfer level (RTL).

Every transition from one technology node to the next technology node has resulted in smaller transistor geometries and thus potentially more functionality implemented per unit of integrated circuit area. Synchronous integrated circuits have further benefited from this development as evidenced by reduced interconnect and cell delays, which has led to performance increases. However, more recent technology nodes have seen a significant slow-down in the reduction of delays and thus a slow-down in the performance increase.

Solutions such as register pipelining have been proposed to further increase the performance. During register pipelining, additional registers are inserted between synchronous elements, which lead to an increase in latency at the benefit of increased clock frequencies and throughput. However, performing register pipelining often involves spending significant time and effort because several iterations of locating performance bottlenecks, inserting or removing registers, and compiling the modified integrated circuit design are usually required.

Situations frequently arise where a register pipelined integrated circuit design still exhibits an unsatisfactory performance after many iterations of inserting or removing registers because adding a pipeline register to a given path in a current iteration may obsolete the effects of having added a register to a different path during a prior iteration.

The difficulty of performing register pipelining is further exacerbated by the facts that the latency in different paths or blocks may be related, that certain conditions such as reset removal may be latency dependent, and that verification related activities such as simulation may need to consider modifications to a test bench and a design-under-test (DUT) caused by register pipelining.

SUMMARY

A design automation tool implemented on computing equipment to develop a circuit design for an integrated circuit may receive a command that defines a valid range for a number of pipeline registers and a circuit description that includes two implementations of a path. A first implementation of the path may include a first number of pipeline registers within the valid range, and a second implementation of the path may include a second number of pipeline registers. The circuit description may initially select the first implementation of the path. The design automation tool may still further select the second implementation of the path and record the selection of the second implementation of the path.

It is appreciated that the present invention can be implemented in numerous ways, such as a process, an apparatus, a system, a device, or instructions on a computer readable medium. Several inventive embodiments of the present invention are described below.

In certain embodiments, the above mentioned circuit description may select the first implementation of the path using a parameter that defines a default value and record the selection of the second implementation of the path by updating the parameter.

If desired, the design automation tool may update a test bench. For example, the test bench may verify the circuit description with the second implementation instead of the first implementation of the path. The test bench may be updated using the recorded selection of the second implementation of the path. Additionally, a simulator tool may perform a simulation using the updated test bench, the circuit description, and the recorded selection.

Further features of the invention, its nature and various advantages, will be more apparent from the accompanying drawings and the following detailed description of the preferred embodiments.

DETAILED DESCRIPTION

Embodiments of the present invention relate to methods for using computer-aided design (CAD) tools, which are sometimes also referred to as design automation (DA) tools or electronic design automation (EDA) tools, for optimizing integrated circuit (IC) designs with register pipelining capabilities for implementation as integrated circuits. The integrated circuits may be any suitable type of integrated circuit, such as microprocessors, application-specific integrated circuits, digital signal processors, memory circuits, etc. If desired, the integrated circuits may be programmable integrated circuits that can be configured by a user to perform the functionality described in the integrated circuit design using programmable circuitry. The programmable circuitry can be configured by adjusting the settings of memory elements.

Register pipelining refers to the process of inserting or removing a register between synchronous elements of an integrated circuit design. For instance, inserting a register between two synchronous elements of an integrated circuit design increases the latency between those two synchronous elements for the benefit of potentially increased clock frequencies and throughput. Register pipelining is a complicated design optimization method that may be very time consuming and expensive to implement as shown in the background section. Therefore, it would be desirable to automate the process of register pipelining in all design steps that may be affected by register pipelining (e.g., simulation).

It will be obvious to one skilled in the art, that the present exemplary embodiments may be practiced without some or all of these specific details. In other instances, well-known operations have not been described in detail in order not to unnecessarily obscure the present embodiments.

Figure 1:
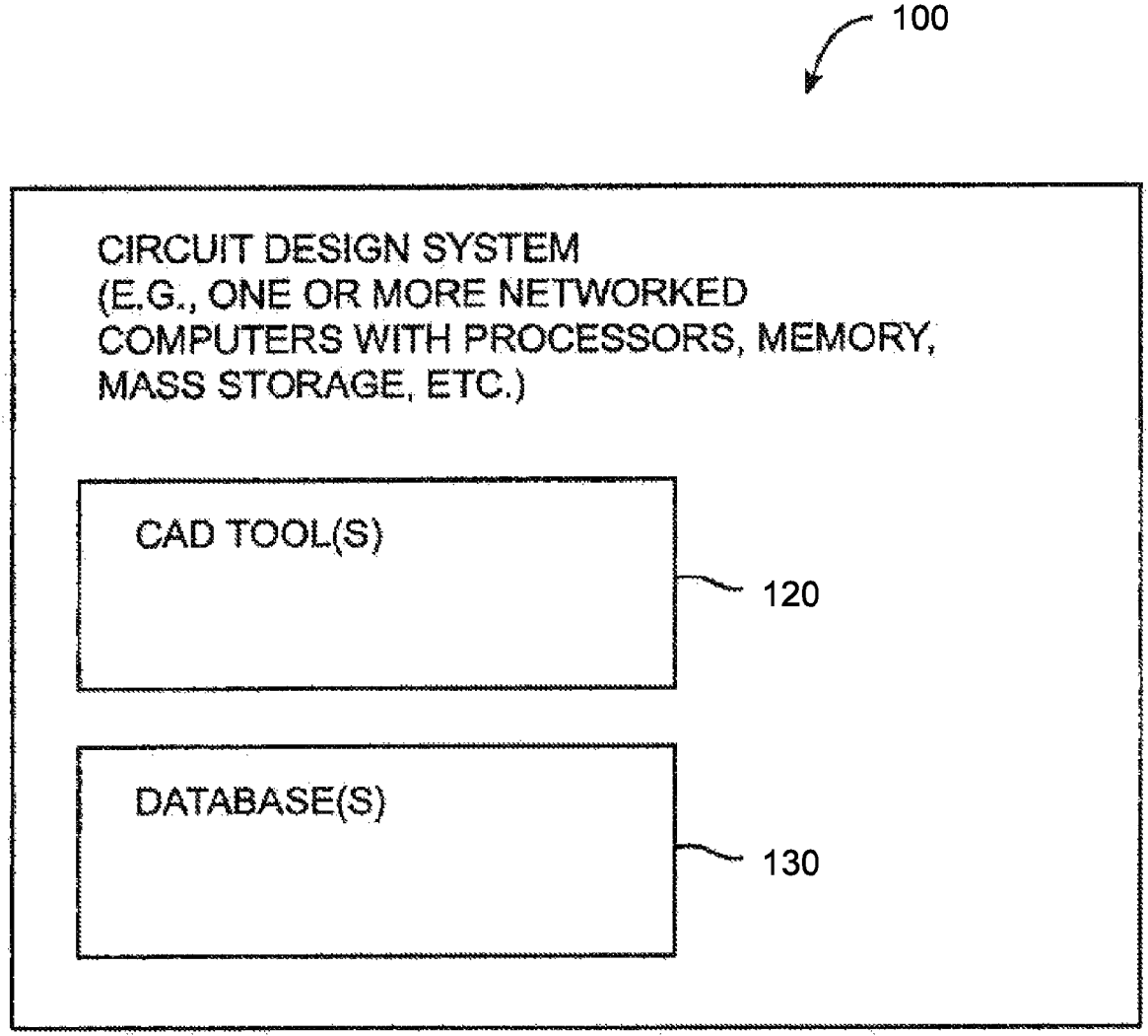
FIG. 1 is a diagram of a circuit design system that may be used to design integrated circuits in accordance with an embodiment.

An illustrative circuit design system 100 in accordance with the present invention is shown in FIG. 1. System 100 may be based on one or more processors such as personal computers, workstations, etc. The processor(s) may be linked using a network (e.g., a local or wide area network). Memory in these computers or external memory and storage devices such as internal and/or external hard disks may be used to store instructions and data.

Software-based components such as computer-aided design tools 120 and databases 130 reside on system 100. During operation, executable software such as the software of computer aided design tools 120 runs on the processor(s) of system 100. Databases 130 are used to store data for the operation of system 100. In general, software and data may be stored on any computer-readable medium (storage) in system 100. Such storage may include computer memory chips, removable and fixed media such as hard disk drives, flash memory, compact discs (CDs), digital versatile discs (DVDs), blu-ray discs (BDs), other optical media, and floppy diskettes, tapes, or any other suitable memory or storage device(s). When the software of system 100 is installed, the storage of system 100 has instructions and data that cause the computing equipment in system 100 to execute various methods (processes). When performing these processes, the computing equipment is configured to implement the functions of the circuit design system.

The computer aided design (CAD) tools 120, some or all of which are sometimes referred to collectively as a CAD tool or an electronic design automation (EDA) tool, may be provided by a single vendor or by multiple vendors. Tools 120 may be provided as one or more suites of tools (e.g., a compiler suite for performing tasks associated with implementing a circuit design in a programmable logic device) and/or as one or more separate software components (tools). Database(s) 130 may include one or more databases that are accessed only by a particular tool or tools and may include one or more shared databases. Shared databases may be accessed by multiple tools. For example, a first tool may store data for a second tool in a shared database. The second tool may access the shared database to retrieve the data stored by the first tool. This allows one tool to pass information to another tool. Tools may also pass information between each other without storing information in a shared database if desired.

Figure 2:
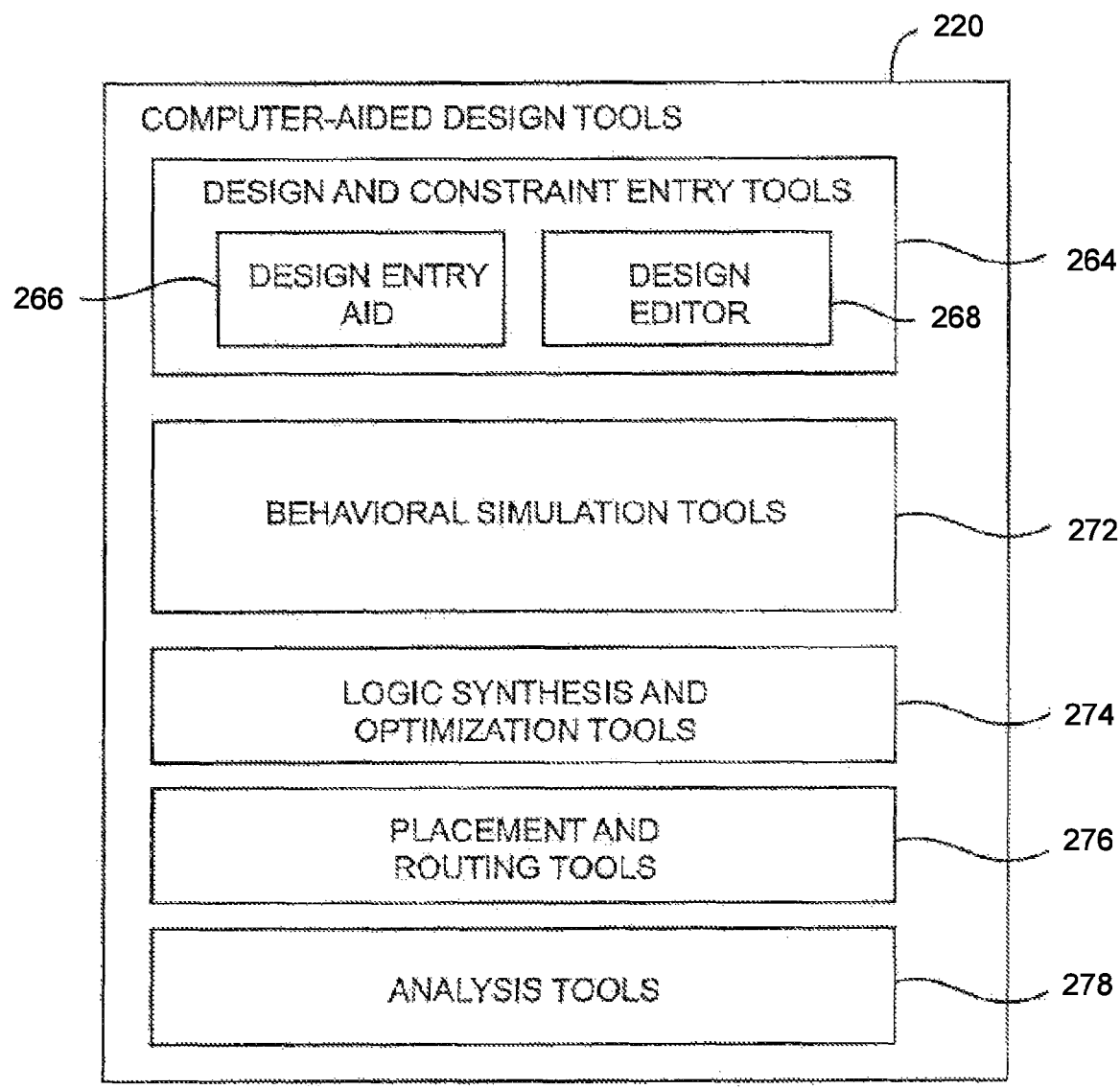
FIG. 2 is a diagram of illustrative computer-aided design (CAD) tools that may be used in a circuit design system in accordance with an embodiment.

Illustrative computer aided design tools 220 that may be used in a circuit design system such as circuit design system 100 of FIG. 1 are shown in FIG. 2.

The design process may start with the formulation of functional specifications of the integrated circuit design (e.g., a functional or behavioral description of the integrated circuit design). A circuit designer may specify the functional operation of a desired circuit design using design and constraint entry tools 264. Design and constraint entry tools 264 may include tools such as design and constraint entry aid 266 and design editor 268. Design and constraint entry aids such as aid 266 may be used to help a circuit designer locate a desired design from a library of existing circuit designs and may provide computer-aided assistance to the circuit designer for entering (specifying) the desired circuit design.

As an example, design and constraint entry aid 266 may be used to present screens of options for a user. The user may click on on-screen options to select whether the circuit being designed should have certain features. Design editor 268 may be used to enter a design (e.g., by entering lines of hardware description language code), may be used to edit a design obtained from a library (e.g., using a design and constraint entry aid), or may assist a user in selecting and editing appropriate prepackaged code/designs.

Design and constraint entry tools 264 may be used to allow a circuit designer to provide a desired circuit design using any suitable format. For example, design and constraint entry tools 264 may include tools that allow the circuit designer to enter a circuit design using truth tables. Truth tables may be specified using text files or timing diagrams and may be imported from a library. Truth table circuit design and constraint entry may be used for a portion of a large circuit or for an entire circuit.

As another example, design and constraint entry tools 264 may include a schematic capture tool. A schematic capture tool may allow the circuit designer to visually construct integrated circuit designs from constituent parts such as logic gates and groups of logic gates. Libraries of preexisting integrated circuit designs may be used to allow a desired portion of a design to be imported with the schematic capture tools.

If desired, design and constraint entry tools 264 may allow the circuit designer to provide a circuit design to the circuit design system 100 using a hardware description language such as Verilog hardware description language (Verilog HDL) or Very High Speed Integrated Circuit Hardware Description Language (VHDL). The designer of the integrated circuit design can enter the circuit design by writing hardware description language code with editor 268. Blocks of code may be imported from user-maintained or commercial libraries if desired.

After the design has been entered using design and constraint entry tools 264, behavioral simulation tools 272 may be used to simulate the functional performance of the circuit design. If the functional performance of the design is incomplete or incorrect, the circuit designer can make changes to the circuit design using design and constraint entry tools 264. The functional operation of the new circuit design may be verified using behavioral simulation tools 272 before synthesis operations have been performed using tools 274. Simulation tools such as behavioral simulation tools 272 may also be used at other stages in the design flow if desired (e.g., after logic synthesis). The output of the behavioral simulation tools 272 may be provided to the circuit designer in any suitable format (e.g., truth tables, timing diagrams, etc.).

Once the functional operation of the circuit design has been determined to be satisfactory, logic synthesis and optimization tools 274 may generate a gate-level netlist of the circuit design, for example using gates from a particular library pertaining to a targeted process supported by a foundry, which has been selected to produce the integrated circuit. Alternatively, logic synthesis and optimization tools 274 may generate a gate-level netlist of the circuit design using gates of a targeted programmable logic device (i.e., in the logic and interconnect resources of a particular programmable logic device product or product family).

Logic synthesis and optimization tools 274 may optimize the design by making appropriate selections of hardware to implement different logic functions in the circuit design based on the circuit design data and constraint data entered by the logic designer using tools 264.

After logic synthesis and optimization using tools 274, the circuit design system may use tools such as placement and routing tools 276 to perform physical design steps (layout synthesis operations). Placement and routing tools 276 are used to determine where to place each gate of the gate-level netlist produced by tools 274. For example, if two counters interact with each other, the placement and routing tools 276 may locate these counters in adjacent regions to reduce interconnect delays or to satisfy timing requirements specifying the maximum permitted interconnect delay. The placement and routing tools 276 create orderly and efficient implementations of circuit designs for any targeted integrated circuit (e.g., for a given programmable integrated circuit such as a field-programmable gate array (FPGA).)

Tools such as tools 274 and 276 may be part of a compiler suite (e.g., part of a suite of compiler tools provided by a programmable logic device vendor). In accordance with the present invention, tools such as tools 274, 276, and 278 automatically take into account the effects of crosstalk between interconnects while implementing a desired circuit design. Tools 274, 276, and 278 may also include timing analysis tools such as timing estimators. This allows tools 274 and 276 to satisfy performance requirements (e.g., timing requirements) before actually producing the integrated circuit.

After an implementation of the desired circuit design has been generated using placement and routing tools 276 the implementation of the design may be analyzed and tested using analysis tools 278. After satisfactory optimization operations have been completed using tools 220 and depending on the targeted integrated circuit technology, tools 220 may produce a mask-level layout description of the integrated circuit or configuration data for programming the programmable logic device.

Figure 3:
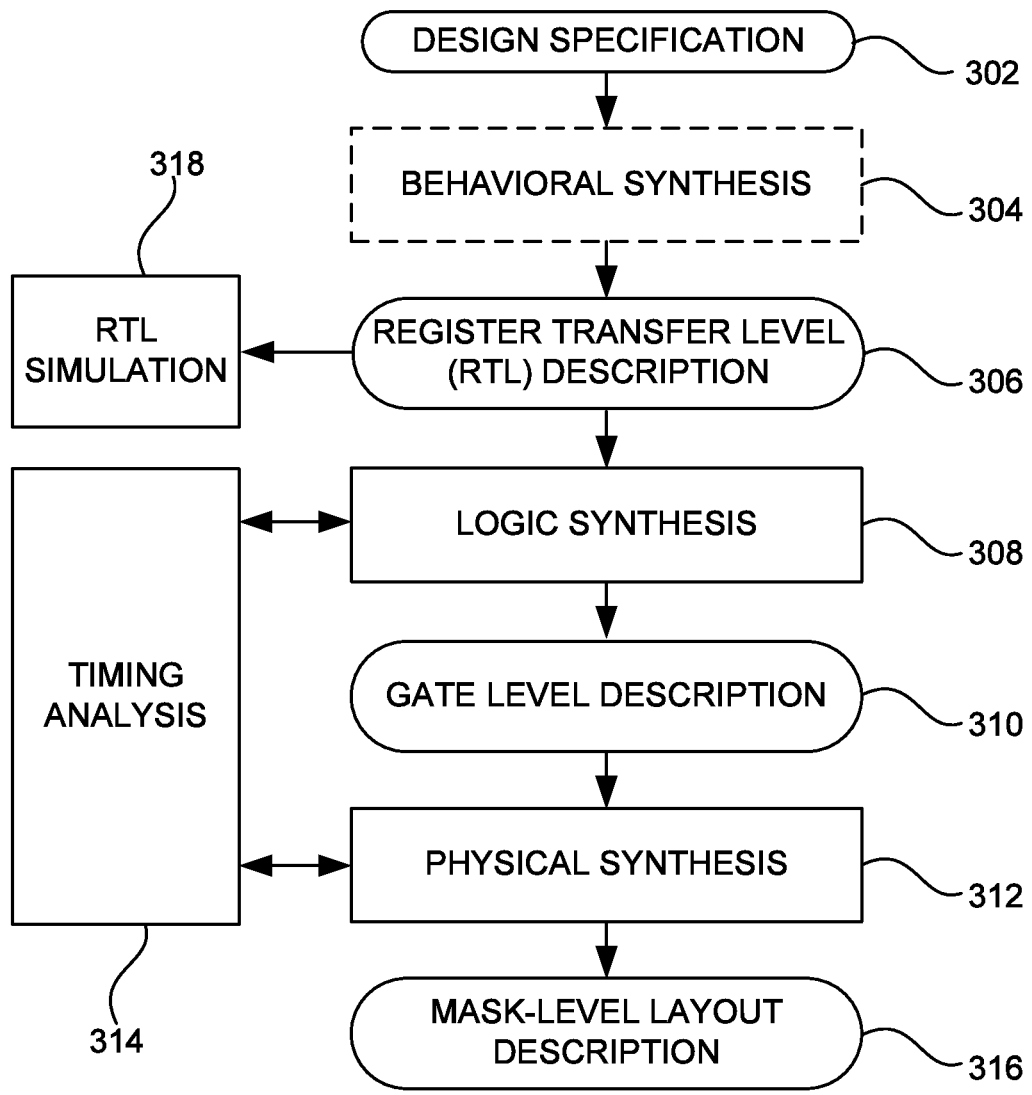
FIG. 3 is a flow chart of illustrative steps for designing an integrated circuit in accordance with an embodiment.

Illustrative operations involved in using tools 220 of FIG. 2 to produce the mask-level layout description of the integrated circuit are shown in FIG. 3.

As shown in FIG. 3, a circuit designer may first provide a design specification 302. The design specification 302 may, in general, be a behavioral description provided in the form of an application code (e.g., C code, C++ code, SystemC code, etc.). In some scenarios, the design specification may be provided in the form of a register transfer level (RTL) description 306. The RTL description may have any form of describing circuit functions at the register transfer level. For example, the RTL description may be provided using a hardware description language such as the Verilog hardware description language (Verilog HDL or Verilog), the SystemVerilog hardware description language (SystemVerilog HDL or SystemVerilog), or the Very High Speed Integrated Circuit Hardware Description Language (VHDL). Alternatively, the RTL description may be provided as a schematic representation.

In general, the behavioral design specification 302 may include untimed or partially timed functional code (i.e., the application code does not describe cycle-by-cycle hardware behavior), whereas the RTL description 306 may include a fully timed design description that details the cycle-by-cycle behavior of the circuit at the register transfer level.

In certain embodiments, design specification 302 or RTL description 306 may include path descriptions for one or more paths in the design. These path descriptions may include multiple implementations of the path, and each path description may include a predetermined number of pipeline registers.

In certain embodiments, design specification 302 or RTL description 306 may include pipeline optimization constraints such as number of registers in a pipeline (e.g., a legal range for the number of registers or a set of allowable discrete numbers of registers), latency, throughput, or any combination thereof. For example, the design specification or the RTL description may include several implementation alternatives for the given path and a parameter that initially selects one of the implementation alternatives.

Design specification 302 or RTL description 306 may also include target criteria such as area use, power consumption, delay minimization, clock frequency optimization, or any combination thereof. The pipeline optimization constraints and target criteria may be collectively referred to as constraints.

Those constraints can be provided for individual paths, portions of individual paths, portions of a design, or for the entire design. For example, the constraints may be provided with the design specification 302, the RTL description 306 (e.g., as a pragma or as an assertion), in a constraint file, or through user input (e.g., using the design and constraint entry tools 264 of FIG. 2), to name a few. In certain embodiments, a given path may have more than one constraint associated with the path, and some of these constraints may be in conflict with each other e.g., a constraint received with the behavioral design specification for a given path may conflict with the constraint received with the RTL description and with a constraint received with a constraint file. In this scenario, a predetermined priority of constraints, which may be defined explicitly or resolved implicitly by CAD tools 220, may determine which of the conflicting constraints is selected. For example, the constraint from the user or a configuration file may override the constraints received from other sources, and a constraint received with the RTL description may override a constraint received with the behavioral design specification.

The constraints may target the entire circuit design or portions of the circuit design. For example, some constraints may be defined globally and thus be applicable to the entire circuit design. Other constraints may be assigned locally and thus be applicable only to the corresponding portions of the circuit design. Consider the scenario in which the circuit design is organized hierarchically. In this scenario, every hierarchical instance may include different assignments. In other words, multiple different constraints may target the same portion of the circuit design, and priorities may be defined explicitly or resolved implicitly by CAD tools 220. For example, a constraint defined at a higher level of the design hierarchy may override a constraint at a lower level. Alternatively, a constraint defined at a lower level of the design hierarchy may override a constraint at a higher level, or individual levels of the design hierarchy may be given priority over other levels of design hierarchy.

If desired, constraints may relate to each other. For example, a first constraint that specifies a first legal range for a number of registers in a first pipeline k may relate to a second constraint that specifies a second legal range for a number of registers in a second pipeline m. As an example, the first pipeline may have between one and five registers (i.e., $1<=k<=5$) and the second pipeline may have between the number of registers in the first pipeline and five registers (i.e., $k<=m<=5$).

Constraints included in design specification 302 or RTL description 306 may be conveyed to CAD tools 220 in the form of variables, parameters, compiler directives, macros, pragmas, or assertions, just to name a few. CAD tools 220 may use a constraint file, which may include a portion or all of the constraints. Such a constraint file may be included with design specification 302 or RTL description 306. In some scenarios, a portion or all of the constraints may be embedded in the circuit design. Alternatively, the constraints may have been defined using the design and constraint entry tools 264 (see FIG. 2).

At step 304, behavioral synthesis (sometimes also referred to as algorithmic synthesis) may be performed to convert the behavioral description into an RTL description 306. Behavioral synthesis may select target path implementations for each of the paths in the behavioral design specification. Each selected target path implementation may be selected based on the pipeline optimization constraints and the target criteria of the design. Step 304 may be skipped if the design specification is already provided in form of an RTL description.

At step 318, behavioral simulation tools 272 may perform an RTL simulation of the RTL description, which may verify the functional performance of the RTL description. If the functional performance of the RTL description is incomplete or incorrect, the circuit designer can make changes to the HDL code (as an example). During RTL simulation 318, actual results obtained from simulating the behavior of the RTL description may be compared with expected results. Consider again the scenario where the circuit design includes several implementation alternatives for a given path and a parameter that initially selects one of the implementation alternatives. In this scenario, the expected results may depend on the selected parameter setting for the target path implementation and provide different expected results based on this parameter setting and the corresponding selected target path implementation. The selected parameter setting for the target path implementation may be communicated to the CAD tools such that the selected number of registers in each target path implementation is reflected in the expected results.

During step 308, logic synthesis operations may generate gate-level description 310 using logic synthesis and optimization tools 274 from FIG. 2. If desired, logic synthesis operations may add or remove pipeline registers in selected paths according to the constraints that are included in design specification 302 or RTL description 306. During step 312, physical synthesis operations (e.g., place and route and optimization operations using for example placement and routing tools 276) may place and connect the different gates in gate-level description 310 in a preferred location on the targeted integrated circuit to meet given target criteria (e.g., minimize area and maximize routing efficiency or minimize path delay and maximize clock frequency or any combination thereof). Physical synthesis operation may add or remove registers in selected paths according to the constraints that are included in design specification 302 or RTL description 306. The output of physical synthesis 312 is a mask-level layout description 316.

Circuit design system 100 may include timing estimator 314 (e.g., formed as part of optimization tools 274, tools 276, or tools 278) that may be used to estimate delays between synchronous elements of the circuit design. For example, timing estimator 314 may estimate delays between registers (e.g., based on the lengths of interconnects, intermediate combinational logic, etc.). The delays may, if desired, be estimated based on metrics such as slack (e.g., the difference between a required arrival time and the arrival time of a signal), slack-ratios, interconnect congestion, or other timing metrics. Circuit design system 100 may use the estimated delays to determine the locations of groups of circuitry while helping to ensure that delays satisfy timing requirements (e.g., critical path delay requirements) or other performance constraints.

Timing estimator 314 may be configured to produce estimated delays that include adjustments for register pipelining. For example, paths that include register pipelining may be assigned an estimated delay value based on the number of registers used for register pipelining in that particular path (e.g., the estimated delay value may be calculated by dividing a delay value estimated for the path without register pipelining by the number of registers used for register pipelining).

Consider the scenario in which a circuit design has a given path for which a maximum register pipeline depth and a minimum register pipeline depth have been defined. Consider further that the given path misses one or more target criteria. For example, timing estimator 314 may determine that a given path has a delay that is larger than the target delay specified for the path as one of the target criteria. Timing estimator 314 may detect that the given path has a larger delay before, during, and after logic synthesis 308 or before, during, and after physical synthesis 312, which may include operations such as clustering, partitioning, placement, and routing, just to name a few. In this scenario and under the condition that the current register pipeline depth is smaller than the maximum register pipeline depth, logic synthesis 308 or physical synthesis 312 may add a register into the path, thereby increasing the register pipeline depth and potentially improving the performance of the given path.

Similarly, consider that the given path meets all target criteria with a large margin. For example, timing estimator 314 may determine that a given path has a delay that is smaller than the target delay specified for the path as one of the target criteria. In this scenario and under the condition that the current register pipeline depth is greater than the minimum register pipeline depth, logic synthesis 308 or physical synthesis 312 may remove a register from the path, thereby decreasing the register pipeline depth and reducing the latency in the given path.

Figure 4:
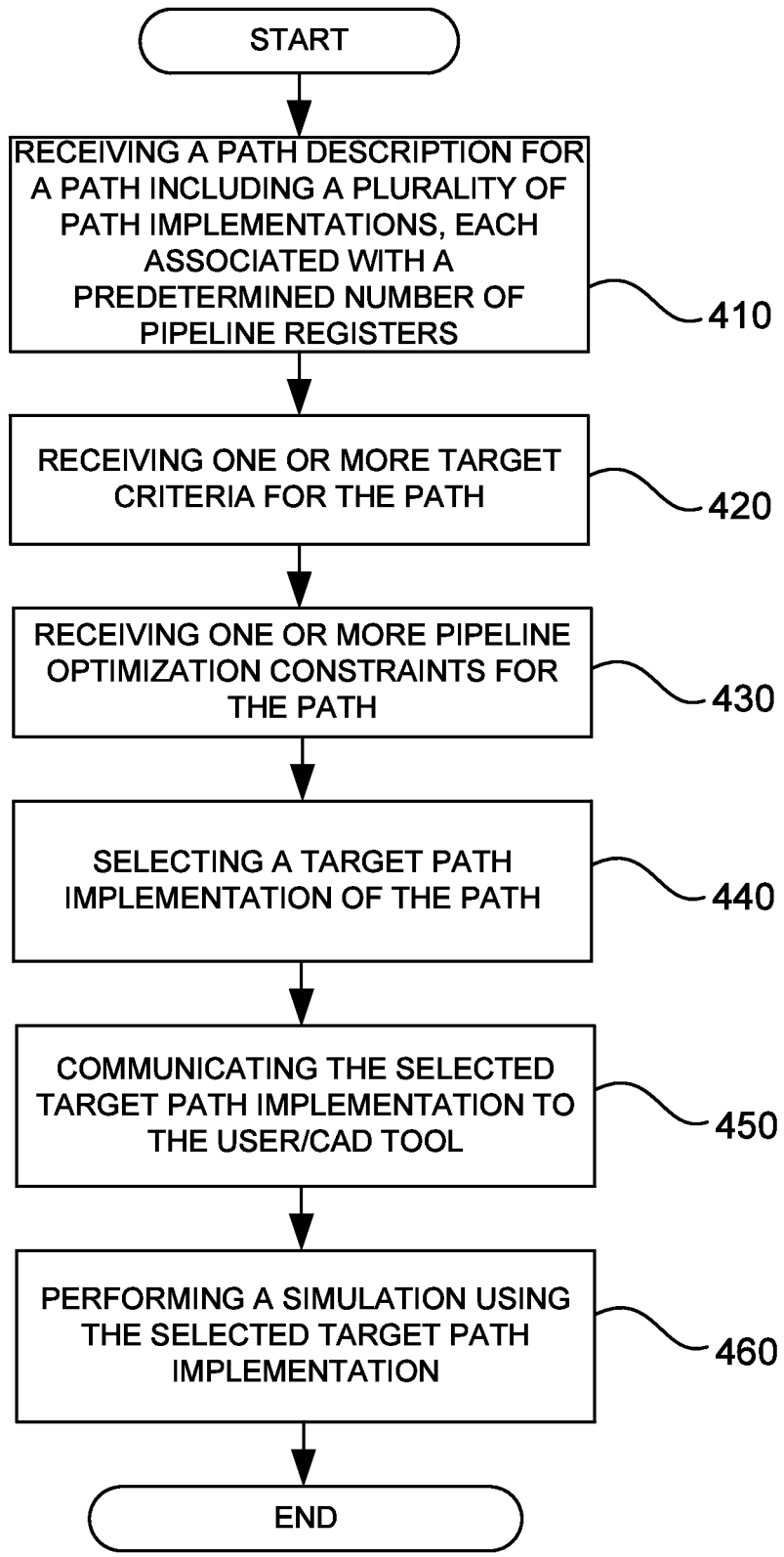
FIG. 4 is a flow chart of illustrative steps for designing an integrated circuit with auto-pipelining capabilities in accordance with an embodiment.

A flow chart of illustrative steps for designing an integrated circuit with auto-pipelining capabilities is shown in FIG. 4. A circuit description containing a path description for a path including a plurality of path implementations is received during step 410. Each of the plurality of path implementations is associated with a predetermined number of pipeline registers. At step 420, a constraint defining one or more target criteria for the path may be received. A constraint defining one or more pipeline optimization constraints for the path may be received at step 430. CAD tools such as logic synthesis and optimization tools 274 or placement and routing tools 276 from FIG. 2 may select one of the plurality of path implementations as a target implementation of the path during step 440 and communicate the selected target path implementation during step 450 to the user, a CAD tool, or both. During step 460, simulation tools such as behavioral simulation tools 272 of FIG. 2 may perform a simulation using the circuit description and the selected target path implementation.

Figure 5:
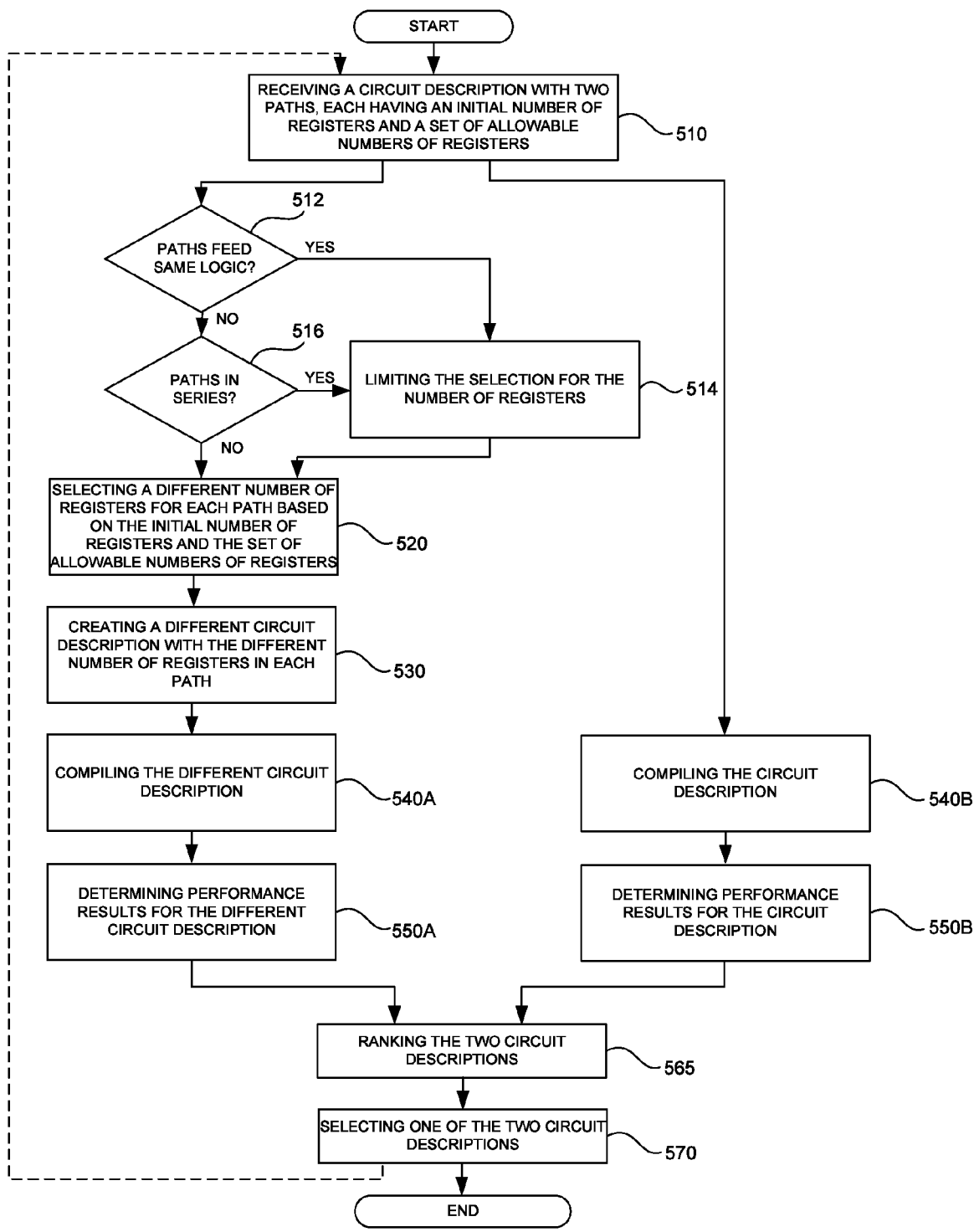
FIG. 5 is a flow chart of illustrative steps for optimizing an integrated circuit with auto-pipelining capabilities in accordance with an embodiment.

The performance of the circuit description with the selected path (e.g., determined during timing analysis with analysis tools 278 of FIG. 2) may miss given performance objectives thereby indicating a need for further optimizations. Illustrative steps for optimizing a circuit design with auto-pipelining capabilities are shown in FIG. 5.

During step 510, a circuit description with two or more paths may be received. Each path may have an initial number of registers and a predetermined set that contains allowable numbers of registers.

Figure 6:
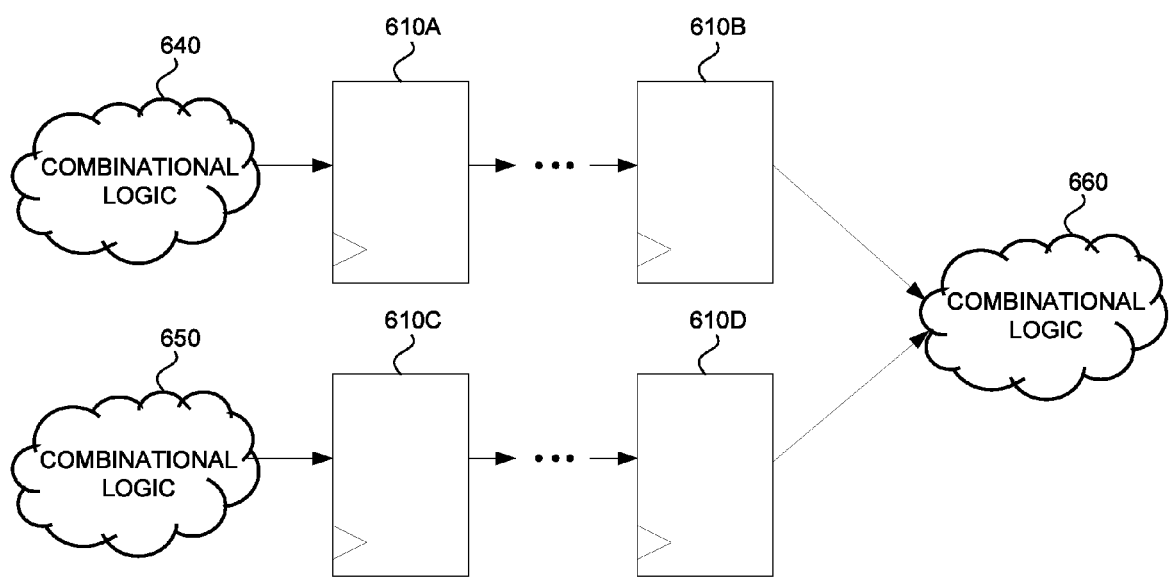
FIG. 6 is a diagram of an illustrative portion of an integrated circuit that receives signals from two register pipeline paths in accordance with an embodiment.

Changing the number of registers in one path may require changing the number of registers in a second path thereby limiting the selection for the number of registers in that second path. Consider the scenario in which two paths feed the same combinational logic as illustrated in FIG. 6. A first signal may be produced by combinational logic 640 and propagate to combinational logic 660 through a first register pipeline in a first path having registers 610A to 610B. In combinational logic 660, this first signal may be combined with a second signal that was produced by combinational logic 650 and propagated through a second register pipeline in a second path having registers 610C to 610D.

Adding a register to the first register pipeline (e.g., between registers 610A and 610B) requires adding a register to the second register pipeline as well (and vice versa) to enable the combination of the first and second signals produced by combinational logic 640 and 650, respectively, in combinational logic 660. Similarly, removing a register from the first register pipeline requires removing a register from the second pipeline (and vice versa).

Figure 7:
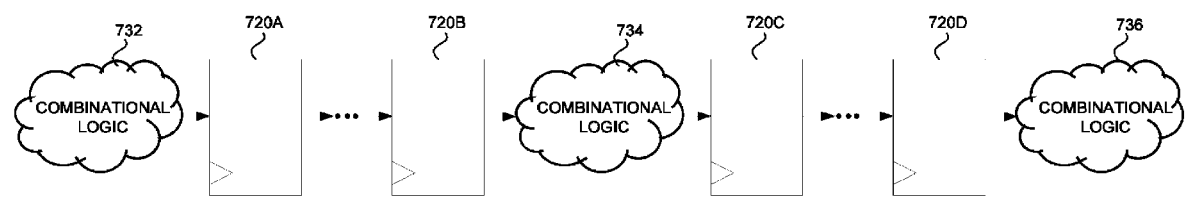
FIG. 7 is a diagram of an illustrative path that includes two register pipelines separated by combinational logic in accordance with an embodiment.

In a different scenario, two paths each having a register pipeline may be arranged in series as illustrated in FIG. 7. In this scenario, a first signal produced by combinational logic 732 may be propagated through the first register pipeline in the first path having registers 720A to 720B. This first signal may be combined with other signals in combinational logic 734 and produce a second signal, which may be propagated through the second register pipeline in the second path having registers 720C to 720D to combinational logic 736. Consider further that the total number of registers between combinational logic 732 and combinational logic 736 is required to be constant (e.g., the combined path may have a given latency requirement due to some industry standard).

In this scenario, adding a register to the first register pipeline (e.g., between registers 720A and 720B) requires removing a register from the second register pipeline as well (and vice versa). Similarly, removing a register from the first register pipeline requires adding a register to the second register pipeline (and vice versa).

In an alternative scenario, two or more paths may share at least a portion of a register pipeline (i.e., each of the two or more paths may pass through the same registers). This alternative scenario may be reduced to a scenario in which two or more paths are arranged in parallel and feed (or are fed by) the same nodes (i.e., the shared register pipeline) and all of these paths being arranged in series with the shared register pipeline. Thus, adding a register to one of the parallel paths requires adding a register to all other parallel paths, and removing a register from one of the parallel paths requires removing a register from all other parallel paths. Similarly, adding a register to the shared register pipeline or to all parallel paths may require removing a register from each of the parallel paths or the shared register pipeline if the total number of registers in each of the combined paths needs to be constant. Accordingly, removing a register from the shared register pipeline or all parallel paths may require adding a register to each of the parallel paths or the shared register pipeline if the total number of registers in each of the combined paths needs to be constant.

After receiving the circuit description with the two paths and the set of allowable numbers of registers during step 510 of FIG. 5, the selection for the number of registers based on the sets of allowable numbers of registers may require further limitations. For example, in the event that the two paths feed the same logic as checked during step 512 (and illustrated above in connection with FIG. 6) or in the event the two paths are in series as checked during step 516 (and illustrated above in connection with FIG. 7) the selection of the number of registers may be limited accordingly during step 514.

During step 520, a different number of registers may be selected for one or both paths. This selection may be based on the initial number of registers, the sets of allowable numbers of registers, and the eventual limitation determined during step 514. A different circuit description including the modified paths may be created during step 530.

During steps 540A and 540B, the different circuit description and the circuit description with the initial number of registers in each path may be compiled, respectively (e.g., using CAD tools 220 of FIG. 2). Performance results for the two compiled circuit descriptions may be determined during steps 550A and 550B, respectively (e.g., using analysis tools 278 of FIG. 2).

During step 565, the two circuit descriptions may be ranked (e.g., based on the performance results determined during steps 550A and 550B), and one of the two circuit descriptions may be selected during step 570 (e.g., based on the ranking determined during step 565).

If desired, the optimization may be performed in multiple iterations. In this case, the selected circuit description replaces the circuit description with the initial number of registers in each path and the next iteration starts with step 510.

Figure 8:
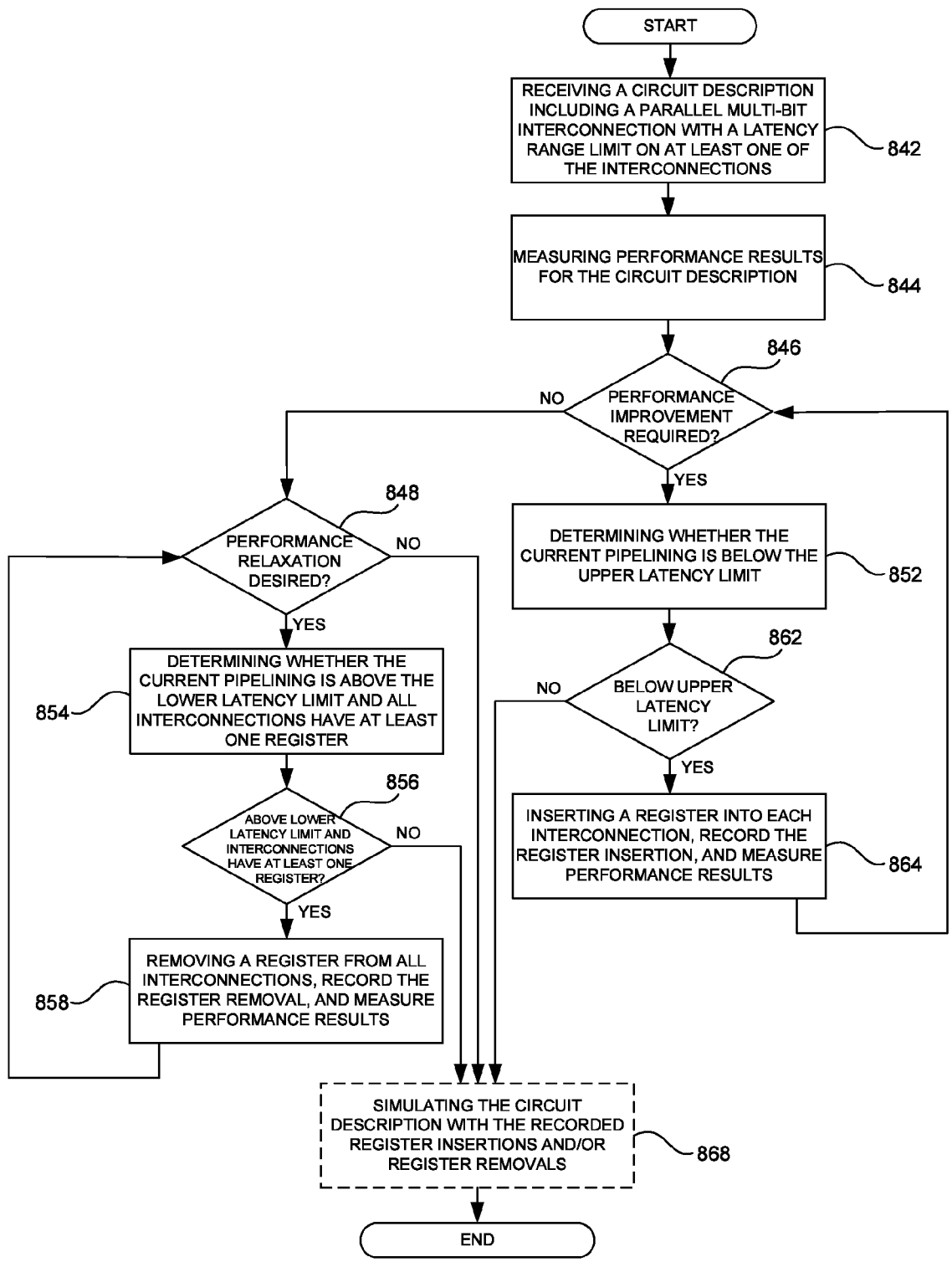
FIG. 8 is a flow chart of illustrative steps for performing auto-pipelining on a circuit design that includes a parallel multi-bit interconnection in accordance with an embodiment.
Figure 9:
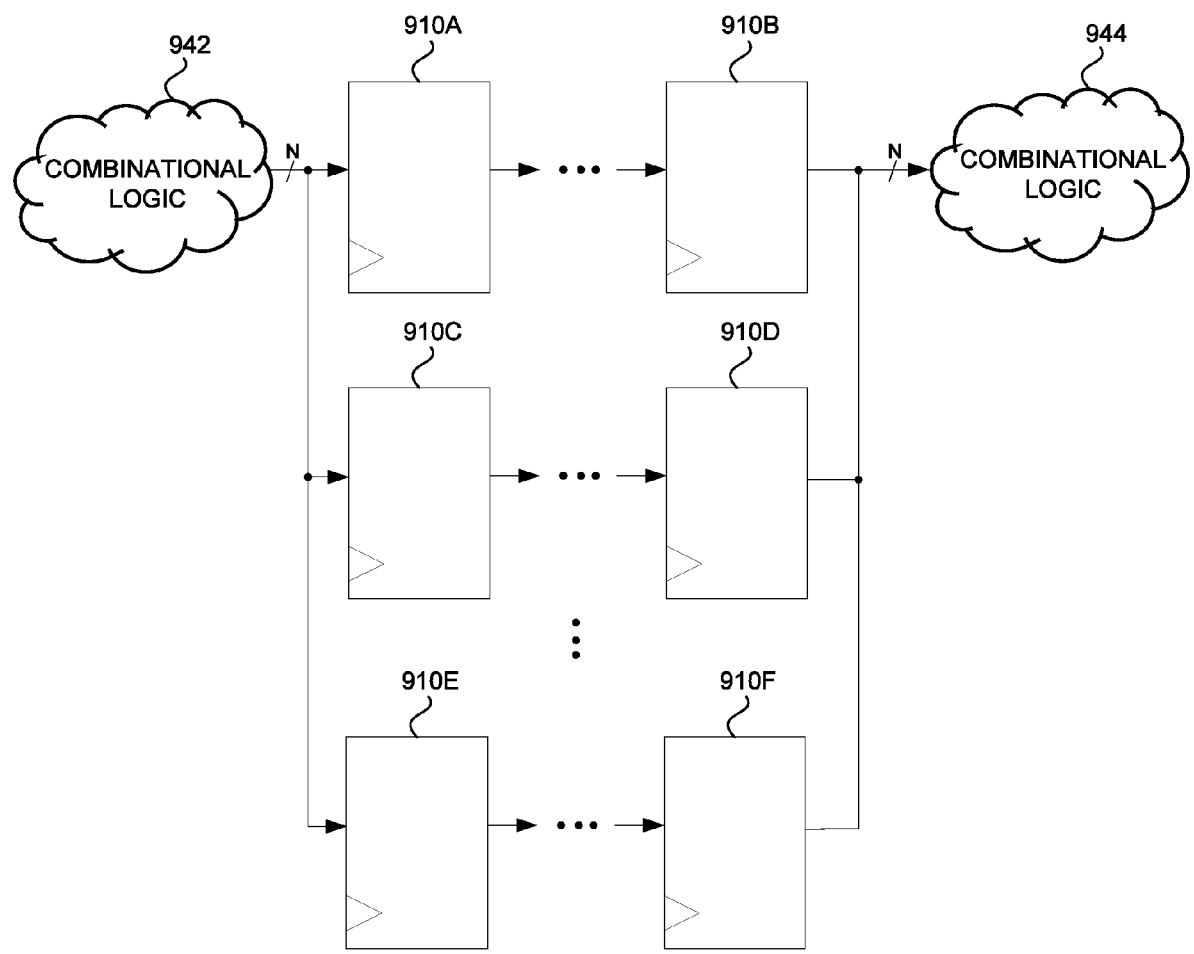
FIG. 9 is a diagram of illustrative parallel paths with pipeline registers between combinational logic in accordance with an embodiment.

A circuit design that includes a multi-bit interconnection may be optimized through auto-pipelining as illustrated in FIG. 8. An illustrative diagram of such a multi-bit interconnection with pipeline registers is shown in FIG. 9. Combinational logic 942 is connected with combinational logic 944 through an N-bit interconnection. Each bit of the N-bit interconnection may have a register pipeline. For example, the first bit of the N-bit interconnection may have registers 910A to 910B, the second bit may have registers 910C to 910D, etc. until the last bit, which may have registers 910E to 910D.

As shown previously in the context of FIG. 6, an addition of a register to any of the N-bit interconnections may require the addition of a register to all other (N-1)-bit interconnections. Similarly, the removal of a register from any of the N-bit interconnections may require the removal of a register from all other (N-1)-bit interconnections.

A CAD tool such as one of CAD tools 220 of FIG. 2 (e.g., logic synthesis and optimization tools 274 or placement and routing tools 276) may receive a circuit description including a parallel multi-bit interconnection with a latency range limit on at least one interconnection of the multi-bit interconnection during step 842 of FIG. 8. At step 844, an analysis tool (e.g., one of analysis tools 278 of FIG. 2) may measure the performance of the received circuit description.

During step 846, a decision as to whether performance improvements are required may be made based on the measured performance results. In response to deciding that a performance improvement is required, the CAD tool may determine whether the current pipelining is below the upper latency limit (i.e., whether a register can be added to the current register pipeline) during step 852. A decision may be made based on step 852 during step 862. In response to deciding that the current pipelining is below the upper latency limit, the CAD tool may insert a register into each interconnection, record the register insertion, and measure performance results at step 864 before returning to step 846. Steps 846, 852, 862, and 864 may be repeated iteratively for as long as performance improvements are required and the current pipelining is below the upper latency limit.

In the event that no performance improvements are required, the CAD tool may decide whether performance relaxation may be desired during step 848. In response to deciding that a performance relaxation is desired (e.g., in an effort to decrease area), the CAD tool may determine whether the current pipelining is above the lower latency limit (i.e., whether a register can be removed from the current register pipeline) and whether there is at least one register in each interconnection during step 854. A decision may be made based on step 854 during step 856. In response to deciding that the current pipelining is above the lower latency limit and each interconnection has at least one register, the CAD tool may remove a register from each interconnection, record the register removal, and measure performance results at step 858 before returning to step 848. Steps 848, 854, 856, and 858 may be repeated iteratively for as long as performance relaxation is desired, the current pipelining is above the lower latency limit, and each interconnection has at least one register.

The optimization of the circuit description with the multibit interconnection may terminate in response to deciding that no performance relaxation is required during step 848, or that the current pipelining is not above the lower latency limit or that not all interconnections have at least one register during step 856, or that the current pipelining is not below the upper latency limit during step 862. Upon terminating the optimization of the circuit description, a simulator tool such as one of behavioral simulation tools 272 of FIG. 2 may optionally simulate the circuit description with the recorded register insertions and/or register removals during step 868.

The foregoing is merely illustrative of the principles of this invention and various modifications can be made by those skilled in the art without departing from the scope and spirit of the invention. The foregoing embodiments may be implemented individually or in any combination.

The method and apparatus described herein may be incorporated into any suitable integrated circuit or system of integrated circuits. For example, the method and apparatus may be incorporated into numerous types of devices such as microprocessors or other ICs. Exemplary ICs include programmable array logic (PAL), programmable logic arrays (PLAs), field programmable logic arrays (FPGAs), electrically programmable integrated circuits (EPLDs), electrically erasable programmable integrated circuits (EEPLDs), logic cell arrays (LCAs), field programmable gate arrays (FPGAs), application specific standard products (ASSPs), application specific integrated circuits (ASICs), just to name a few.

The programmable integrated circuit described herein may be part of a data processing system that includes one or more of the following components; a processor; memory; I/O circuitry; and peripheral devices. The data processing system can be used in a wide variety of applications, such as computer networking, data networking, instrumentation, video processing, digital signal processing, or any suitable other application where the advantage of using programmable or re-programmable logic is desirable. The programmable integrated circuit can be used to perform a variety of different logic functions. For example, the programmable integrated circuit can be configured as a processor or controller that works in cooperation with a system processor. The programmable integrated circuit may also be used as an arbiter for arbitrating access to a shared resource in the data processing system. In yet another example, the programmable integrated circuit can be configured as an interface between a processor and one of the other components in the system. In one embodiment, the programmable integrated circuit may be one of the families of devices owned by the assignee.

Although the method operations were described in a specific order, it should be understood that other operations may be performed in between described operations, described operations may be adjusted so that they occur at slightly different times or described operations may be distributed in a system which allows the occurrence of the processing operations at various intervals associated with the processing, as long as the processing of the overlay operations are performed in a desired way.

The foregoing is merely illustrative of the principles of this invention and various modifications can be made by those skilled in the art without departing from the scope and spirit of the invention. The foregoing embodiments may be implemented individually or in any combination.

What is claimed is:

1. A method for using circuit design computing equipment, the method comprising:
    with the circuit design computing equipment, receiving a path description for a path that conductively couples a source node to a destination node in an integrated circuit, wherein the path description includes a plurality of path implementations for the path, and wherein a predetermined number of pipeline registers is associated with each path implementation in the plurality of path implementations;
    with the circuit design computing equipment, receiving a target criterion for the path, wherein the target criterion for the path are selected from the group consisting of: performance, area usage, number of registers, power dissipation, clock rate, throughput, and latency;
    with the circuit design computing equipment, receiving a pipeline optimization constraint for the path, wherein the pipeline optimization constraint specifies at least one allowable number of pipeline registers for the path; and
    with the circuit design computing equipment, selecting a target path implementation that satisfies the target criterion, the target path implementation being selected from the plurality of path implementations, and the predetermined number of pipeline registers associated with the target path implementation is one of the at least one allowable number of pipeline registers for the path.

2. The method of claim 1, wherein the pipeline optimization constraint for the path is selected from the group consisting of number of registers, latency, and throughput.

3. The method of claim 1, wherein the integrated circuit comprises a programmable integrated circuit, and wherein the pipeline optimization constraint for the path is based on a resource constraint in the programmable integrated circuit.

4. The method of claim 3, wherein the resource constraint in the programmable integrated circuit includes a routing resource constraint selected from the group consisting of: number of local interconnect wires, number of horizontal interconnect wires, number of vertical interconnect wires, number of diagonal interconnect wires, number of routing multiplexers, and number of clock signal distribution wires.

5. The method of claim 3, wherein the resource constraint in the programmable integrated circuit includes a storage resource constraint selected from the group consisting of: number of registers, number of latches, and number of memory elements.

6. The method of claim 1, wherein the path description comprises a register transfer level (RTL) description.

7. The method of claim 1, wherein the pipeline optimization constraint is received from user input.

8. The method of claim 1, wherein the pipeline optimization constraint is received from a configuration file.

9. The method of claim 8, wherein the configuration file includes another pipeline optimization constraint specifying a minimum and a maximum allowable number of pipeline registers for the path.

10. The method of claim 8, wherein the configuration file includes another pipeline optimization constraint specifying a maximum allowable number of pipeline registers for all paths of an integrated circuit.

11. The method of claim 8, wherein the configuration file includes an additional pipeline optimization constraint specifying a minimum allowable number of pipeline registers for all paths on an integrated circuit.

12. The method of claim 1, wherein the pipeline optimization constraint is received from a behavioral model.

13. The method of claim 1 further comprising:
determining an improved path implementation that satisfies the target criterion, the improved path implementation having an improved path performance criterion compared to a corresponding path performance criterion of the target path implementation, wherein a number of pipeline registers associated with the improved path implementation is different from the predetermined number of pipeline registers of the path description; and
communicating the determined number of pipeline registers to a user.

14. The method of claim 13, wherein determining the number of pipeline registers further comprises:
determining whether the determined number of pipeline registers satisfies the pipeline optimization constraint for the path.

15. The method of claim 1, wherein the selected target path implementation violates at least one of the target performance criteria, the method further comprising:
determining an improved path implementation that satisfies the target criterion, wherein a number of pipeline registers associated with the improved path implementation is different from the predetermined number of pipeline registers of the path description; and
communicating the determined number of pipeline registers to a user.

16. The method of claim 15, wherein determining the number of pipeline registers further comprises:
determining whether the determined number of pipeline registers satisfies the pipeline optimization constraint for the path.

17. The method of claim 1 further comprising:
communicating the target path implementation to a design description of the integrated circuit.

18. A method for using a design automation tool implemented on computing equipment to optimize a circuit design of an integrated circuit, comprising:
with the computing equipment, receiving a first circuit design description having first and second paths that each conductively couple a source node to a destination node in an integrated circuit, wherein the first path includes a first number of registers, and wherein the second path includes a second number of registers;
with the computing equipment, receiving information identifying first and second allowable numbers that specify how many registers are allowed for the first and second paths, respectively;
with the computing equipment, selecting a third number for the registers of the first path based on the first allowable number;
with the computing equipment, selecting a fourth number for the registers of the second path based on the second allowable number; and
with the computing equipment, creating a second circuit design description by modifying the first circuit design description to include the third number of registers in the first path and the fourth number of registers in the second path.

19. The method of claim 18, further comprising:
at least partially compiling the first and second circuit design descriptions; and
obtaining performance results for the at least partially compiled first and second circuit design descriptions.

20. The method of claim 19, further comprising:
generating a ranking based on the performance results for the at least partially compiled first and second circuit design descriptions; and
selecting one of the first and second circuit design descriptions based on the ranking.

21. The method of claim 18, wherein a portion of the circuit design receives signals from the first path and the second path, and wherein selecting the third number of registers and the fourth number of registers further comprises:
defining a subset of the first allowable number of registers in the first path based on the first allowable number of registers, the first number of registers, the second allowable number of registers, and the second number of registers;
defining a subset of the second allowable number of registers in the second path based on the first allowable number of registers, the first number of registers, the second allowable number of registers, and the second number of registers; and
selecting the third number of registers from the subset of the first allowable number of registers and the fourth number of registers from the subset of the second allowable number of registers.

22. The method of claim 18, wherein the first circuit design description comprises a path having a total number of registers, wherein the path includes first and second paths, and wherein the third number of registers and the fourth number of registers are selected based on the total number of registers.

23. The method of claim 18, wherein the first circuit description comprises verification instructions, and wherein the first allowable number of registers in the first path and the second allowable number of registers in the second path are based on the verification instructions.

24. Non-transitory computer-readable storage media for compiling a circuit description, wherein the circuit description specifies a plurality of parallel paths, wherein a path of the plurality of parallel paths has a limitation on the total allowable number of registers for that path, the non-transitory computer-readable storage media comprising instructions for:
determining that a current number of registers is smaller than the limitation on the total allowable number of registers in the path;
inserting a register in each of the plurality of parallel paths in response to determining that the current number of registers is smaller than the limitation on the total allowable number of registers in the path; and
recording the register insertion.

25. The non-transitory computer-readable storage media of claim 24 further comprising instructions for:
measuring performance results for the circuit description that has the register inserted in response to inserting the register.

26. The non-transitory computer-readable storage media of claim 24 further comprising instructions for:
removing a register from each of the plurality of parallel paths; and
recording the register removal.

27. The non-transitory computer-readable storage media of claim 24, further comprising instructions for:
determining a maximum number of additional registers based on the current number of registers and the limitation on the total allowable number of registers in the path;
inserting the maximum number of additional registers in each of the plurality of parallel paths; and measuring performance results for the circuit description that has the maximum number of additional registers in each of the plurality of parallel paths.

28. The non-transitory computer-readable storage media of claim 27 further comprising instructions for:
   removing a register from each of the plurality of parallel paths;
   measuring performance results for the circuit description that has the register removed from each of the plurality of parallel paths; and
   selecting between the circuit description with the maximum number of additional registers in each of the plurality of paths and the circuit description with the register removed from each of the plurality of paths based on a comparison of the performance results.

* * * * *

UNITED STATES PATENT AND TRADEMARK OFFICE
CERTIFICATE OF CORRECTION

PATENT NO. : 9,251,300 B2
APPLICATION NO. : 14/064031
DATED : February 2, 2016
INVENTOR(S) : Michael D. Hutton et al.

Page 1 of 1

It is certified that error appears in the above-identified patent and that said Letters Patent is hereby corrected as shown below:

On the title page item (72), lines 4-5,
Please change the name of the fourth inventor from "Herman Henry Schmidt" to "Herman Henry Schmit".

Signed and Sealed this
Twelfth Day of April, 2016

Michelle K. Lee
*Director of the United States Patent and Trademark Office*